(12) United States Patent
Possing et al.

(10) Patent No.: US 10,650,351 B2
(45) Date of Patent: May 12, 2020

(54) AUTO-CALENDARING

(71) Applicant: Microsoft Technology Licensing, LLC, Redmond, WA (US)

(72) Inventors: Denis L. Possing, Issaquah, WA (US); Gail Giacobbe, Seattle, WA (US); Jane T. Kim, Seattle, WA (US); Nathaniel E. B. Auer, Bellevue, WA (US); Stefanie J. Danhope, Seattle, WA (US); Lorrissa J. Reyes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/979,066

(22) Filed: May 14, 2018

(65) Prior Publication Data
US 2018/0260783 A1 Sep. 13, 2018

Related U.S. Application Data

(63) Continuation of application No. 13/898,461, filed on May 20, 2013, now Pat. No. 10,007,897.

(51) Int. Cl.
G06F 3/048 (2013.01)
G06Q 10/10 (2012.01)
H04M 1/725 (2006.01)

(52) U.S. Cl.
CPC ....... G06Q 10/109 (2013.01); *G06Q 10/1095* (2013.01); *H04M 1/72547* (2013.01)

(58) Field of Classification Search
CPC .......... G06F 17/3053; G06F 17/30864; G06F 17/30867; G06F 17/30029; G06F 17/277; G06Q 10/109; G06Q 10/107; H04L 67/306

USPC ............... 707/721, 748, 749, 750, 751, 768
See application file for complete search history.

(56) References Cited

U.S. PATENT DOCUMENTS

| | | | |
|---|---|---|---|
| 2009/0187467 A1* | 7/2009 | Fang | G06F 16/335 705/7.29 |
| 2011/0106892 A1* | 5/2011 | Nelson | G06Q 10/109 709/206 |
| 2011/0184772 A1* | 7/2011 | Norton | G06Q 10/02 705/7.18 |
| 2012/0101818 A1* | 4/2012 | Scott | G06Q 10/109 704/231 |

(Continued)

FOREIGN PATENT DOCUMENTS

| JP | 2002024188 A | 1/2002 |
|---|---|---|
| JP | 2011257939 A | 12/2011 |

OTHER PUBLICATIONS

"Office Action Issued in Australian Patent Application No. 2014268840", dated Jan. 29, 2019, 3 Pages.

(Continued)

*Primary Examiner* — Alex Olshannikov
(74) *Attorney, Agent, or Firm* — Rainier Patents, P.S.

(57) ABSTRACT

The description relates to auto-calendaring. One example can obtain content relating to a calendarable event. The example can also communicate the content to an auto-calendaring service. The example can also receive a response from the auto-calendaring service. The response can indicate that the calendarable event has been added to a calendar or can request further information about the calendarable event.

20 Claims, 7 Drawing Sheets

INSTANCE 7

INSTANCE 8

(56) References Cited

U.S. PATENT DOCUMENTS

2014/0032678 A1* 1/2014 Koukoumidis .... G06Q 30/0255
709/205
2014/0146200 A1* 5/2014 Scott ........................ G06K 9/34
348/231.99

OTHER PUBLICATIONS

"Third Office Action Issued in China Patent Application No. 201480029294.9", dated Nov. 28, 2018, Nov. 28, 2018, 6 Pages.
"Office Action Issued in Japanese Patent Application No. 2016-514980", dated Oct. 22, 2018, 4 Pages.
"Office Action Issued in Japanese Patent Application No. 2016-514980", dated Dec. 3, 2019, 7 Pages.

* cited by examiner

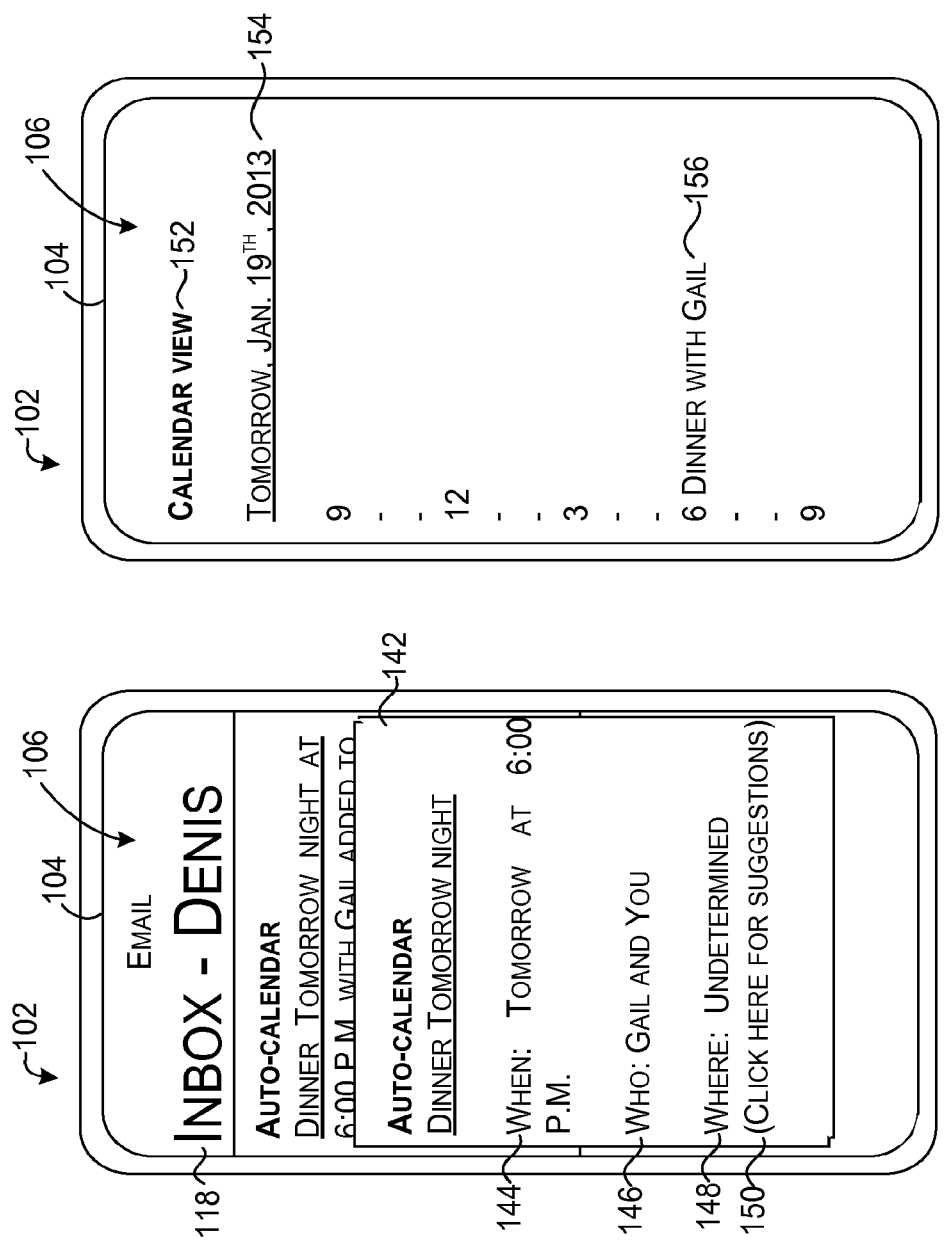

AUTO-CALENDARING

BACKGROUND

Electronic calendars have been in use for quite some time. However, many events never make it to the calendar because of the perceived inconvenience to the user to manually add the event to his/her calendar. For instance, the user may think it takes too long to add the event to his/her calendar. As a result, the user may procrastinate and not add the event to the calendar or may just write it down on a piece of paper. Further, the user may be utilizing a type of device, such as a smart phone that does not lend itself to traditional manual calendar entry. As such, the user's electronic calendar tends to be an incomplete representation of their schedule which may cause them to inadvertently double-book events or miss events because they forget about them.

SUMMARY

The described concepts relate to auto-calendaring. One example can obtain content relating to a calendarable event. The example can also communicate the content to an auto-calendaring service. The example can also receive a response from the auto-calendaring service. The response can indicate that the calendarable event has been added to a calendar or can request further information about the calendarable event.

Another example can obtain a data item from a user and extract text from the data item. The example can analyze the text to identify at a first confidence level whether the text includes a potential event. This example can also determine at a second confidence level whether the potential event relates to a known event. The example can further identify at a third confidence level whether the potential event matches an event profile of the user. The example can take an action on behalf of the user based upon the first, second, and third confidence levels.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 1A-1C, 2, and 3 illustrate a computing device upon which auto-calendaring functionalities can be accomplished in accordance with some implementations of the present concepts.

DETAILED DESCRIPTION

Overview

This patent relates to auto-calendaring. The user can have any type of data item, such as an email, a picture, a text communication, etc. and indicate that he/she wants to utilize auto-calendaring. The auto-calendaring can detect one or more events from the data item and auto-calendar some or all of the events to the user's calendar. Thus, with as little as a single action, the user can have events automatically added to his/her electronic calendar.

First Scenario Examples

Figure 1A:
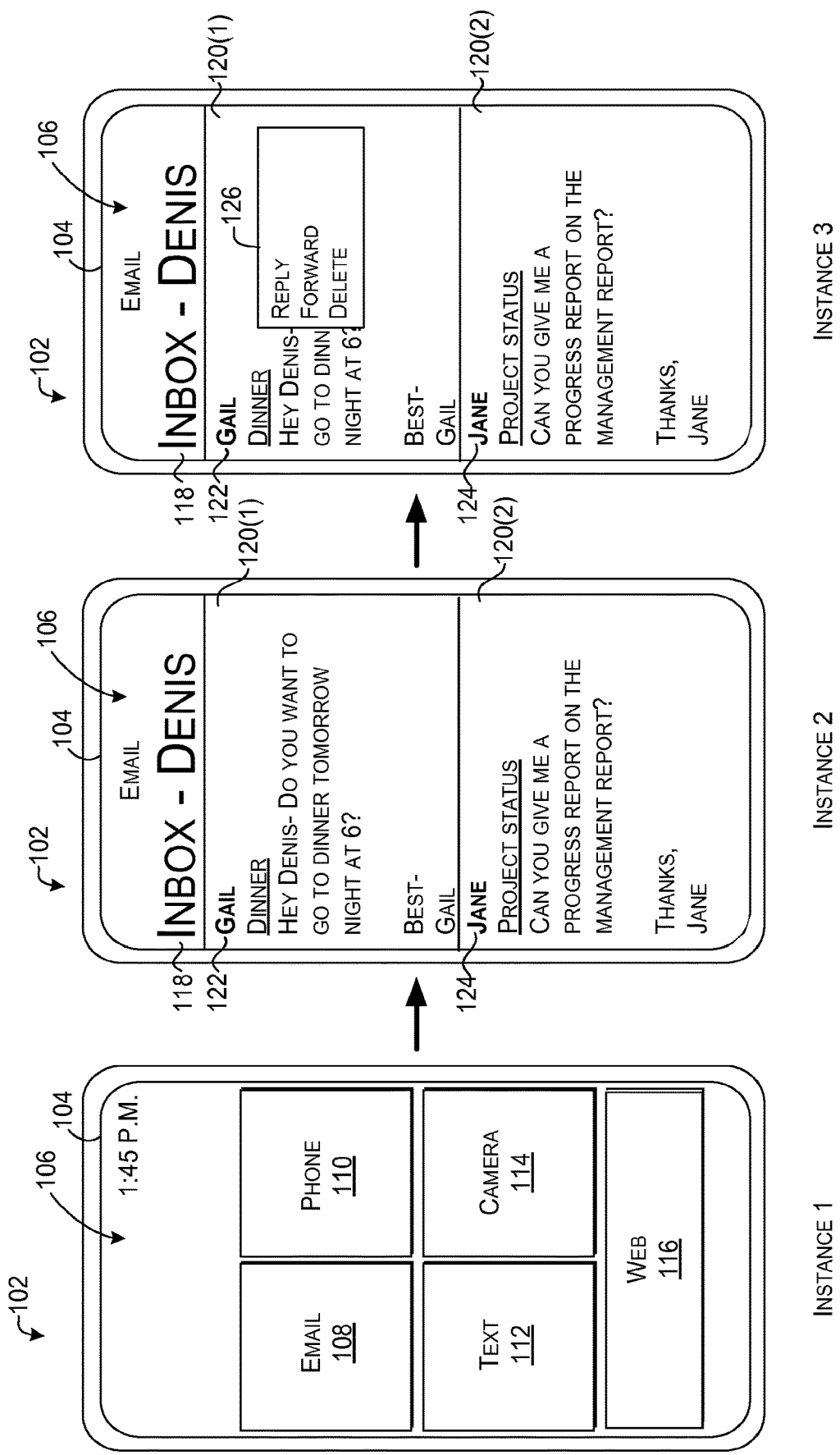
Figure 1B:
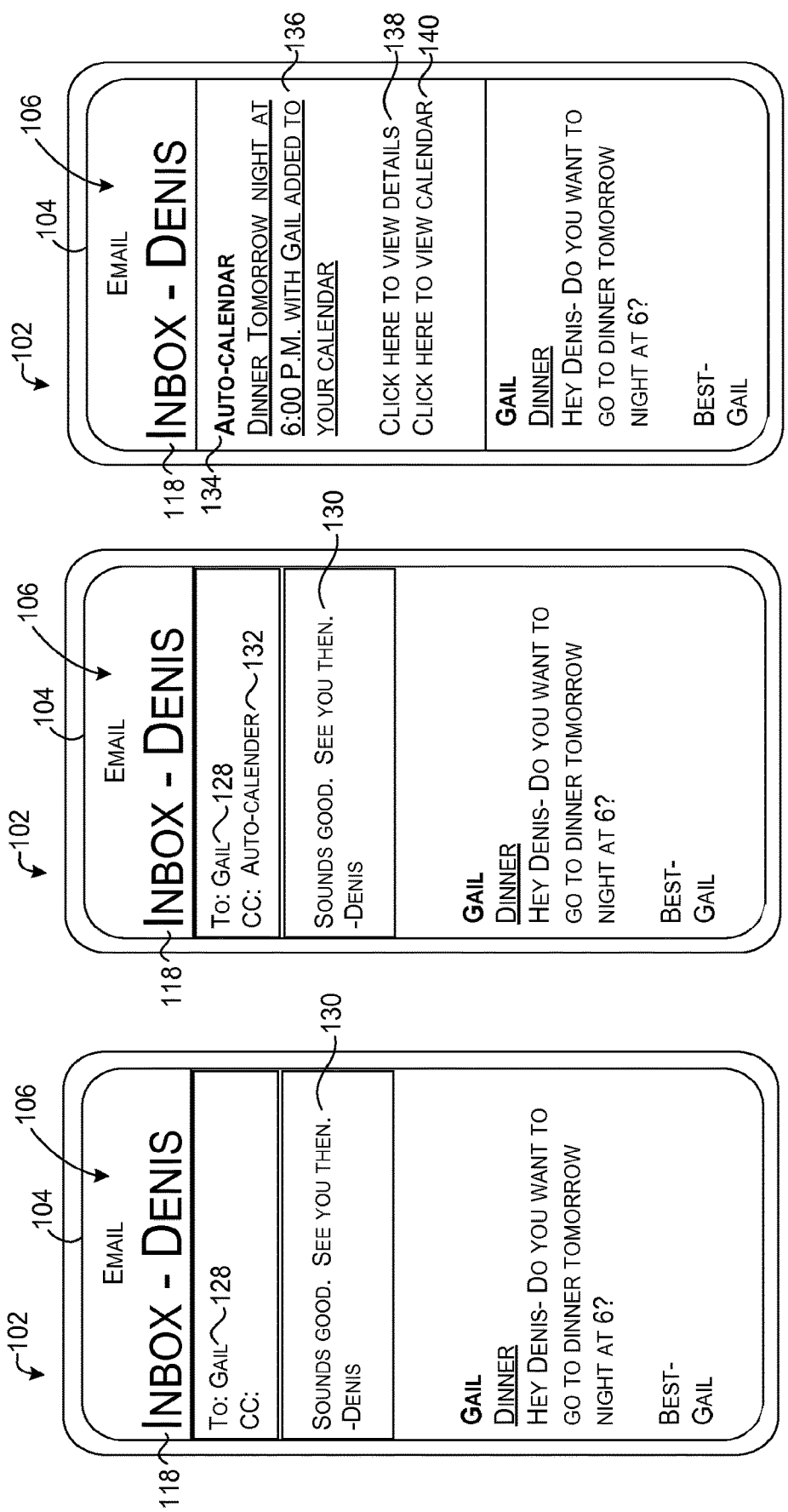

For purposes of explanation consider FIGS. 1A-1C which collectively show a computing device 102 in several consecutive instances (e.g., FIG. 1A shows instances 1-3, FIG. 1B shows instances 4-6, FIG. 1C shows instances 7-8). In this example, computing device 102 is manifest as a smart phone type mobile computing device that has a display 104. The computing device 102 can be configured to present a graphical user interface (GUI) 106 on the display 104.

While a smart phone type mobile computing device is illustrated, the concepts apply to other types of computing devices, such as notebook computers, desktop computers, and/or tablet computers, among others. For purposes of explanation, assume that computing device 102 belongs to a user named "Denis".

In this example, the computing device 102 can provide multiple functionalities or features to the user. As illustrated in Instance 1, the features can include an email functionality 108, a phone functionality 110, a text functionality 112, a camera functionality 114, and a web browsing functionality 116. Of course, the computing device can include alternative or additional functionality, such as a media player functionality and/or a social media functionality, among others. Assume for purposes of explanation that in Instance 1, the user has selected the email functionality 108.

Instance 2 shows the computing device 102 responsive to the user selection related to Instance 1. In this case, the computing device is now displaying features relating to the email functionality 108. Specifically, the GUI relates to Denis' inbox as indicated at 118. In this example, the inbox shows two emails 120. The first email 120(1) is from Gail as indicated at 122. The second email 120(2) is from Jane as indicated at 124.

In this case, assume that Denis reads Gail's email 120(1) and wants to go to dinner. Toward this end, he can tap the display 104 (or otherwise control the device).

Instance 3 shows subsequent GUI 106 that allows Denis to "Reply", "Forward", or "Delete" the email from Gail at 126. Assume for purposes of explanation that Denis selects "Reply".

Instance 4 shows a subsequent GUI 106 that shows the reply email to Gail at 128. Further, Denis has added text at 130 that says "Sounds good. See you then. —Denis". Assume for purposes of explanation that Denis would like to have the dinner event on his calendar, but does not want to take the time to add it manually.

Instance 5 shows the GUI 106 with a feature for automatically calendaring the dinner event for Denis. In this case, Denis simply adds "Auto-calendar" as a CC address to the reply email as indicated at 132. In this case "Auto-calendar" can be thought of as an alias for an auto-calendar feature or service rather than the actual email address. At this point, assume that Denis sends the reply email to Gail.

Instance 6 shows a subsequent GUI 106. This example shows a new email 134 in Denis' inbox 118. The new email 134 is from the auto-calendar service. The new email indicates at 136 that the dinner event has been added to Denis' calendar. The email also offers the option for Denis to view details at 138 or view his calendar at 140. Instance 7 shows an example where Denis selects to view details 138. Instance 8 shows an example where Denis selects to view his calendar. Of course, the illustrated email response is only one possible email response that could be generated by the auto-calendaring service. Another example may indicate to Denis that the event occurs at a time that is already booked on Denis' calendar and ask for clarification. Other examples are described below.

Instance 7 shows an auto-calendar view 142 of the scheduled dinner event. Details of the scheduled dinner event include "When: Tomorrow at 6:00 P.M." as indicated at 144, "Who: Gail and You" as indicated at 146, and "Where: Undetermined" at 148. Notice also that at 150, the auto-calendar view offers the user the option of receiving suggestions for the undecided detail (e.g., "(Click here for suggestions)"). Thus, Denis could utilize this feature to find restaurants for dinner. For example, the restaurants could be selected based upon various parameters, such as proximity to Gail and Denis, ratings of restaurants from the web, known preferences of Gail and/or Denis, past dinner calendar events that Gail and/or Denis have attended, targeted advertisements, and/or coupons, among others.

Instance 8 shows a version of GUI 106 generated responsive to Denis selecting to see his calendar at Instance 6. In this case, a calendar view 152 is presented for Denis. The Calendar view shows the day the dinner event was auto-calendared for (e.g., "Tomorrow, Jan. 19, 2013") as indicated at 154. The dinner event can be seen at 6:00 P.M. as indicated at 156. In summary, the present auto-calendaring concepts enable a user to have an event populated to their calendar with very little effort on their part. In this example, the user simply added an email address of the auto-calendaring service as a recipient of an email that included details about the event. Of course, this is just one example of how the auto-calendaring service can be invoked. For example, the user could alternatively forward an existing email to the auto-calendaring service.

Second Scenario Examples

Figure 2:
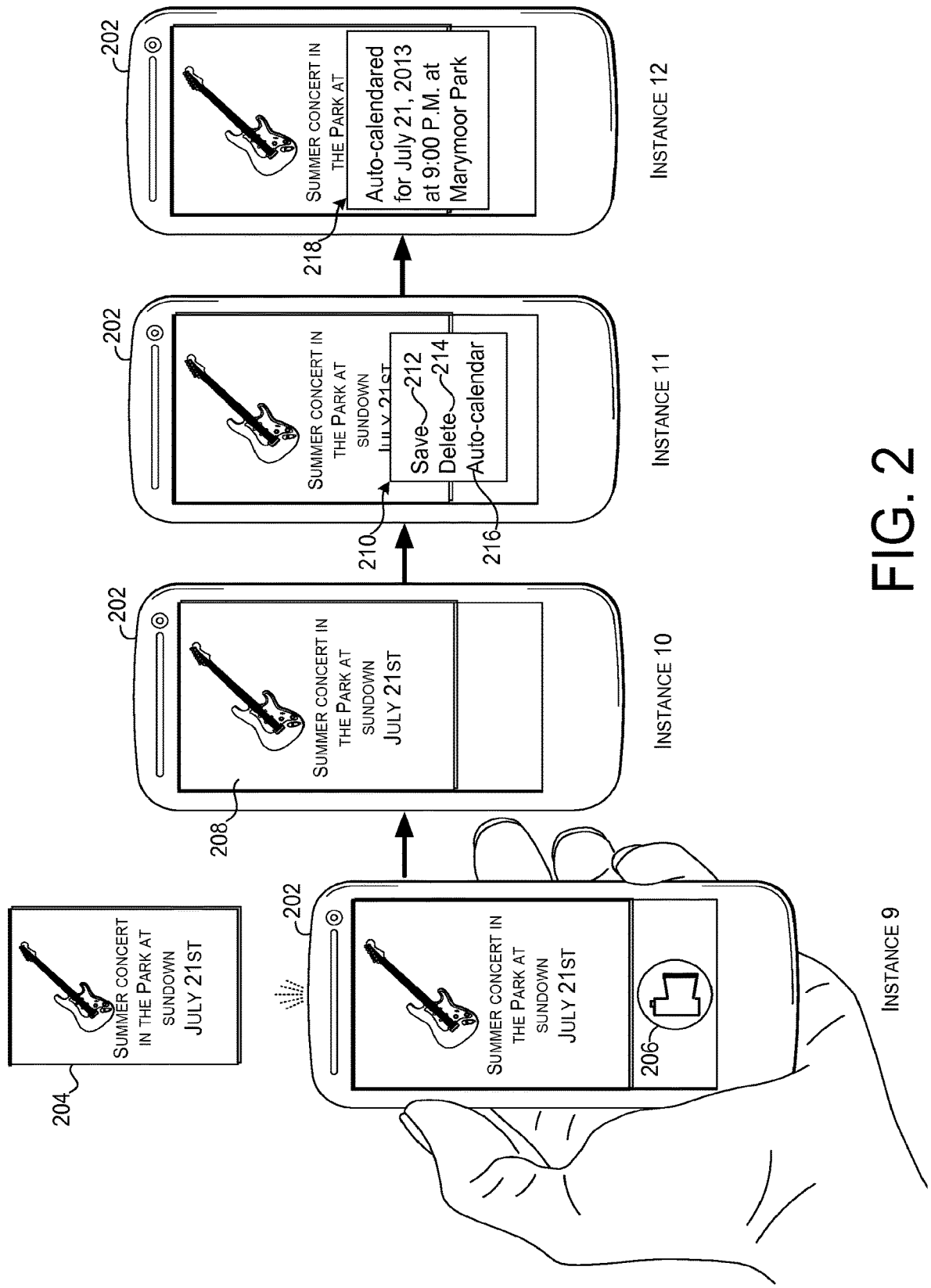

FIG. 2 shows another auto-calendaring implementation on a device 202 at Instances 9-12. In this case, as seen in Instance 9, assume that a user of the device sees a flyer 204 for a concert. The user looks at the flyer and decides that he/she wants to go to the concert. In this implementation, the user can take a picture of the flyer 204 with device 202 as indicated at 206.

Instance 10 shows a picture of the flyer on device 202 at 208. The device can offer the user various options for the picture. The options can be accessed in various ways. In this case, assume that the user taps the picture (or otherwise requests to take an action relative to the picture, such as through a voice command or gesture).

Instance 11 shows a set of options for the picture at 210. In this case, the options include a "Save" option at 212, a "Delete" option at 214, and an "Auto-calendar" option 216. In this case, assume that the user wants to have the picture auto-calendared and selects the "Auto-calendar" option 216. The picture can then be auto-calendared for the user. The auto-calendaring can be performed by a user-invokable auto-calendaring service that is resident on the device 202.

Alternatively, the auto-calendaring service can be remote from the device. For instance, user selection of the auto-calendaring option can cause the picture 210 to be communicated to the auto-calendaring service. For instance, the picture can be emailed to the auto-calendaring service. The auto-calendaring service can then add the event from the picture to the user's calendar.

Instance 12 shows a confirmation 218 that the event of the picture has been added to the user's calendar. Note that in this case, greater detail is included in the auto-calendar event indicated in the confirmation than was contained in the picture itself. The auto-calendaring service can utilize various resources to obtain these details. For example, the auto-calendaring service can use optical character recognition (OCR) technology to identify the text in the picture. The auto-calendaring service could also submit metadata (such as GPS data) from the picture to a location resource to determine that the picture was taken at Marymoor Park in Redmond, Wash., for example. The auto-calendaring service could then submit the text data and the location data to a search engine resource. Results from the search engine could confirm that in fact there is a concert scheduled for Marymoor Park on that day and at the specified time (rather than the more ambiguous "sundown" provided in the flyer).

First Scenario Examples

Figure 3:
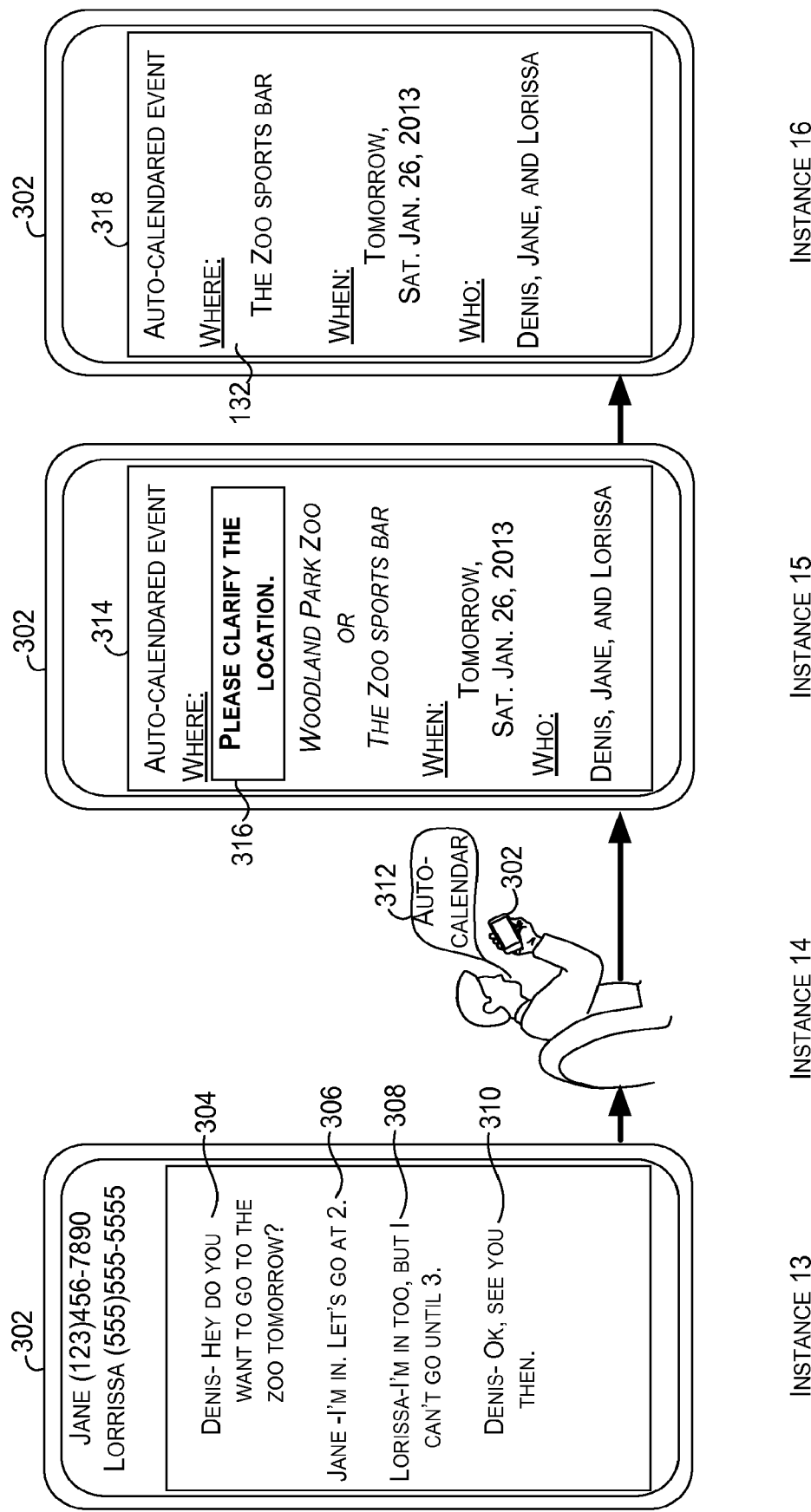

FIG. 3 shows another auto-calendaring scenario at instances 13-16. This auto-calendaring scenario relates to auto-calendaring in a texting environment represented on a mobile computing device 302.

At Instance 13, for purposes of explanation, assume that the user Denis sent an initial text to Jane and Lorissa asking "Hey do you want to go to the zoo tomorrow?" as indicated at 304. As indicated at 306, Jane replied "I'm in. Let's go at 2." Similarly, Lorissa replied "I'm in too, but I can't go until 3." as indicated at 308. Finally, Denis replies "Ok, see you then." as indicated at 310. Assume for purposes of explanation that Denis lives near Seattle, Wash. and that Seattle has a 'zoo' (i.e., a place to view animals) and a (hypothetical) sports bar named the 'zoo'. These aspects will be discussed below beginning at Instance 15.

At this point, assume that Denis wants to use the auto-calendar feature to add the event to his calendar. At Instance 14, Denis uses a verbal command (e.g., "Auto-calendar") as indicated at 312 to control his mobile computing device 302. (Of course, other types of commands can be utilized). The verbal auto-calendar command can cause content (e.g., 'text') described relative to Instance 13 to be obtained by the auto-calendaring service. Alternatively, a screen capture can be performed on the mobile computing device's display and OCR used to obtain the text from the screen capture. The text can then be analyzed to generate the event. Two potential outcomes are described below relative to Instances 15-16.

Instance 15 shows one potential response 314 to the user's auto-calendaring command of Instance 14. In this case, the auto-calendaring service detected an event in the text. However, in this case, some of the details of the event are ambiguous to the auto-calendaring service so the potential response 314 requests clarification from the user. The other details are populated into the calendar. In this example, the clarification relates to the 'where' detail (e.g., location) of the event as indicated at 316. Assume for purposes of example that the auto-calendaring service accessed search engine resources relative to the term "zoo" relative to the Seattle area and obtained results for "Woodland Park Zoo"

and "The Zoo sports bar". In this case, the auto-calendaring service was not able to determine with a high degree of certainty which location the user intended and thus requested the clarification. The user can make the clarification. The user clarification can then be utilized to update the calendar event. In summary, the response can indicate what action was taken on behalf of the user by the auto-calendaring service and allow the user to provide clarification that can be utilized to augment the action.

Instance 16 shows an alternative potential response 318. In this case, assume that the auto-calendaring service accessed search engine resources relative to the term "zoo" relative to the Seattle area and obtained results for "Woodland Park Zoo" and "The Zoo sports bar" as described relative to Instance 15. However, assume further that the auto-calendaring service also applied a user profile (e.g., Denis' profile) to the search results. Assume in this example that Denis' profile indicated that Denis is an avid sports fan who especially likes watching football. However, the profile does not include any information about animals. Assume further that the auto-calendaring service returns to the search engine resources with the information from the user profile and discovers that the championship football game is tomorrow at 3:00 P.M. and that the game will be shown at The Zoo sports bar. With this information, the auto-calendaring service can automatically calendar the event with a relatively high degree of certainty that the details of the event are correct.

To summarize, in this latter case, the auto-calendaring service determined that the supplied content (e.g., the text history) contained an event, what the event was, and that the event was something that the user was likely to do. In some implementations, where the confidences associated with these determinations are above respective threshold levels, the event may be auto-calendared without sending a reply to the user (e.g., when the confidence is high that the event is 'correct' the event can calendared without bothering the user with a notification). Stated another way, the auto-calendaring service can determine similarity scores between the event detected in the supplied content and results returned from the search engine resource to determine a likelihood that the identified (e.g., potential event) corresponds to a known event. Similarly, the auto-calendaring service can determine similarity scores between the event detected (and/or the known event) and the user profile to determine if the detected event and/or the known event match something that the user is likely to do.

In an alternative situation, if the confidence levels are above a first threshold value, the event can be tentatively scheduled and presented to the user for approval (e.g., confirmation). If the confidence levels are below both thresholds, the user can be queried for more information that can then be used in the auto-calendaring process.

First System Examples

Figure 4:
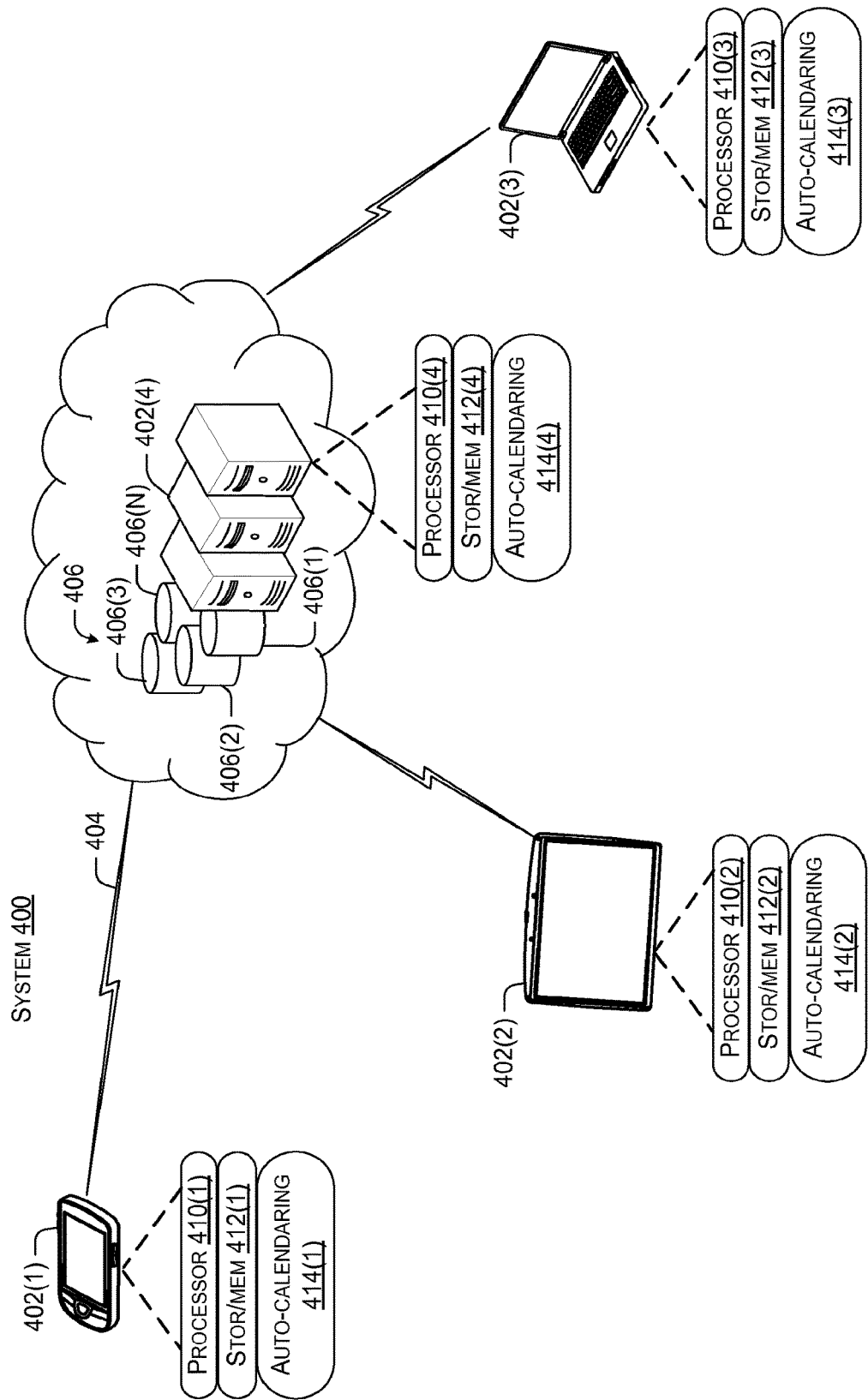
FIG. 4 illustrates an example of a system upon which auto-calendaring functionalities can be accomplished in accordance with some implementations of the present concepts.

FIG. 4 shows system 400 that can enable the auto-calendaring concepts described above. In this example, the system 400 includes several devices 402. In this case, the devices are manifest as a smartphone type computer 402(1), a pad type computer 402(2), a notebook type computer 402(3), and a set of cloud-based server type computers 402(4). Smartphone type computer 402(1) is similar to devices 102, 202, and 302 described above relative to FIGS. 1A-1C, 2, and 3, respectively. (In this discussion, the use of a designator with the suffix, such as "(1)", is intended to refer to a specific device instance. In contrast, use of the designator without a suffix is intended to be generic). Of course not all device implementations can be illustrated and other device implementations should be apparent to the skilled artisan from the description above and below.

The devices 402 can communicate over one or more networks 404 (represented by 'lightning bolts'). The devices can also communicate with resources 406. Non-limiting examples of resources can include a global contacts/calendaring service resources 406(1), enterprise directory service resources 406(2), search engine resources 406(3), and monetization engine resources 406(N). Other non-illustrated examples of resources can include optical character recognition resources, machine learning resources, natural language processing/generating resources, and/or user profile database resources, among others. In some cases, the present concepts can be implemented by an individual device 402 acting in isolation. In other cases, the device can implement the present concepts by operating cooperatively with one or more other devices and/or the resources 406. These variations are described in more detail below.

Devices 402 can include several elements which are defined below. For example, these devices can include a processor 410, storage/memory 412, and/or an auto-calendaring component 414. The auto-calendaring component can perform some or all of the auto-calendaring services described above. The devices can alternatively or additionally include other elements, such as input/output devices (e.g., touch, voice, and/or gesture), buses, graphics cards, Wi-Fi circuitry, cellular circuitry, positional circuitry (absolute location (e.g., GPS)) and/or relative location (accelerometers, magnetometers, among others) etc., which are not illustrated or discussed here for sake of brevity.

The term "device", "computer", or "computing device" as used herein can mean any type of device that has some amount of processing capability and/or storage capability. Processing capability can be provided by one or more processors (such as processor 410) that can execute data in the form of computer-readable instructions to provide a functionality. Data, such as computer-readable instructions, can be stored on storage, such as storage/memory 412 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices 402 can include traditional computing devices, such as personal computers, desktop computers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and may have a self-contained power source (e.g., battery).

In the illustrated implementation, devices 402 are configured with a general purpose processor 410 and storage/memory 412. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the auto-calendaring component 414 can be installed as hardware, firmware, or software during manufacture of the device 402 or by an intermediary that prepares the device for sale to the end user. In other instances, the end user may install the auto-calendaring component 414, such as in the form of a downloadable application. Further, in some instances individual devices 402 can include robust auto-calendaring components. In other cases individual devices may have less robust or thin auto-calendaring components where a majority of the functionality is performed by other devices, such as cloud based devices, for presentation on the thin device. In some cases, the local device (e.g., the user's device) can provide a web-view of content generated remotely, such as by the cloud based devices.

Stated another way, in some implementations, an individual device, such as device 402(1) may have a less robust instance of the auto-calendaring component 414(1) such that some or all of the functionality provided by the auto-calendaring component 414(1) is performed remotely, such as at cloud-based device 402(4) and communicated back to device 402(1) for presentation to the user. Further, the auto-calendaring component may include individual resources 406 or access individual resources. For example, the auto-calendaring component may include a natural language processing/generation resource or may access a remote natural language processing/generation resource.

The auto-calendaring component 414 can be a freestanding application or the auto-calendaring component can be an element of a contact management application or a calendaring application, among others. Examples of contact management applications can include Outlook® from Microsoft® Corporation, Apple Contacts™, and/or Google Gmail™.

Auto-calendaring component 414 can be configured to cause a calendar related GUI to be presented to a user on the user's computing device. The auto-calendaring component can derive event data from content submitted by the user. This event data can then be utilized with various resources to determine whether the event data relates to one or more events, what the events are, and whether the user is likely to participate in such events.

The resources 406 can be local or remote relative to the auto-calendaring component 414. The auto-calendaring component can utilize individual resources to obtain data related to user supplied content that may relate to an event. The obtained data can then be leveraged with other resources. For instance, the auto-calendaring component 414 can utilize OCR resources to derive text from user supplied content. The auto-calendaring component 414 can supply the output derived text from the OCR resources to natural language processing resources to analyze the derived text. The auto-calendaring component can then utilize the output of the natural language processing resources to facilitate a meaningful search utilizing the search engine resources. The auto-calendaring component can utilize information from a user profile to refine the search. In the absence of a user profile or in addition to a user profile, the auto-calendaring component can utilize other resources relating to the user, such as data from their personal data (e.g., global contacts/calendaring service resources 406(1) or work data enterprise directory service resources 406(2)) to further determine or refine the event details.

Of course, security of personal confidential information can be maintained while implementing the inventive concepts. The user can be queried for permission prior to any access to, or use of, personal data. Further, any use of the personal data can be strictly limited to the authorized uses and be securely maintained. Also, the user permission may be conditional and/or relate to specific data sources. For example, the user may give permission to use their data to construct the user profile but not for any use other use. Further, the user may authorize access to their calendar data, but not their email data, for instance. Further still, if the user does not give consent to use of their personal information, the present concepts can be employed satisfactorily with the available resources.

As mentioned above, the auto-calendaring component 414 can access the user's profile as a resource. In some cases, the auto-calendaring component 414 can create and/or contribute to (e.g., update) the user profile. The user profile can be created manually (e.g., by asking the user a set of questions about his/her interests and activities). Alternatively or additionally, the user profile can be constructed from analysis of user data. For instance, the user's calendar can be accessed to identify what types of events the user has participated in previously. Similarly, the user's texts and/or emails can be analyzed to construct the user profile.

Note further that the user profile may include multiple user profiles. For example, the search engine resource may generate a user profile related to the user's search history and an email application may generate a profile of the user's email history. These various user profiles can contribute information that can be utilized by the auto-calendaring component 414.

In summary, the user profile can indicate details of what the user tends to do and/or other details, such as whom they do certain types of events with and/or where they do them. Further, the user profile can be searchable in various ways. For example, the user may tend to engage in certain types of events during the week after work with people from work and engage in different activities on the weekend with different people. This information can contribute to the accuracy of identifying the correct events from user supplied content.

The auto-calendaring component 414 can aid the user in creating a user account or otherwise configuring auto-calendaring services. For instance, the user can identify who they are (e.g., supply their account information) and indicate which calendar(s) they want the auto-calendared events to be populated to. For instance, the user may define that certain types of events be calendared to their work calendar and other types of events be calendared to their private calendar. For example, the user can define that emails from certain addresses or containing certain words, go to a particular calendar.

First Method Example

Figure 5:
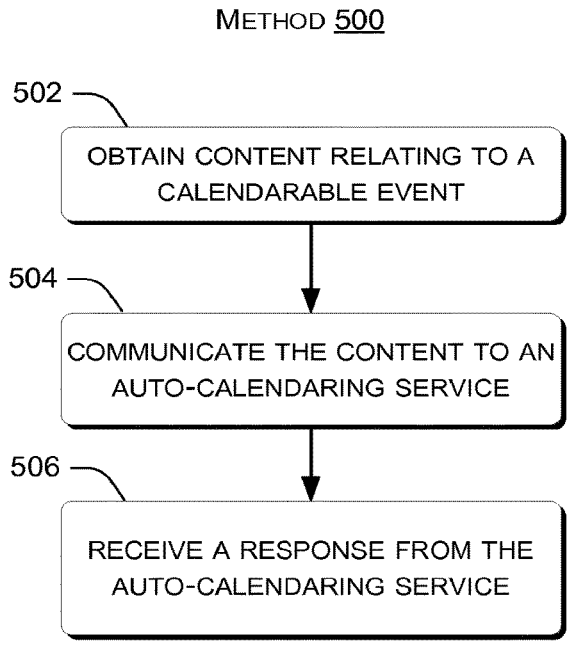
FIGS. 5-6 show examples of auto-calendaring methods in accordance with some implementations of the present concepts.

FIG. 5 shows a flowchart of a method 500 relating to auto-calendaring.

The method can obtain content relating to a calendarable event at 502. Examples of content are described above. Content can be thought of as anything that the user desires to generate a calendar event from. For example, the content can be manifest as text and/or media. As such, the content can be thought of as a data item that can be processed by, or on behalf of, an auto-calendaring service.

The method can communicate the content to an auto-calendaring service at 504. In some cases the communicating can occur within a device. For instance, an image, screenshot, or text displayed on a device can be communicated to the auto-calendaring service resident on the device. For example, the auto-calendaring service can be provided by an auto-calendaring component, such as an application stored on the device. In other configurations, the auto-calendaring service can be remote from the device and the communicating can entail communicating the content over a network to the remote auto-calendaring service.

The method can receive a response from the auto-calendaring service at 506. In some cases, the response indicates that the calendarable event has been added to a calendar or requests further information about the calendarable event.

Second Method Example

Figure 6:
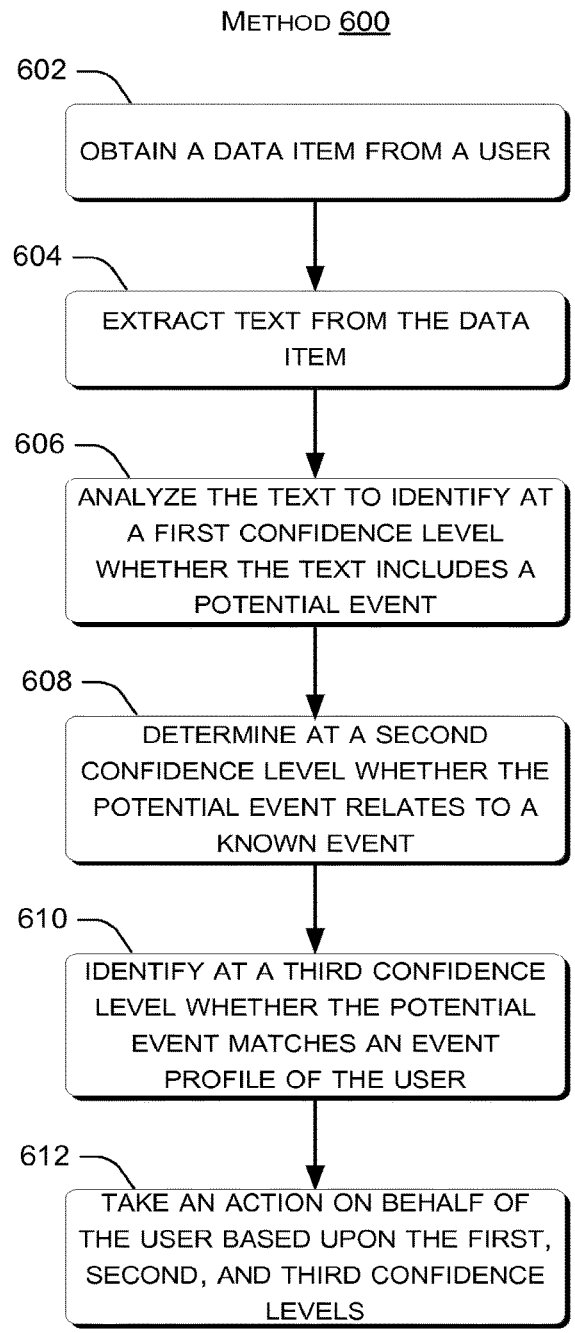

FIG. 6 shows a flowchart of a method 600 relating to auto-calendaring.

The method can obtain a data item from a user at 602. In some cases, the data item can be obtained from the user via text or email, among other technologies. Examples of data items can include a text, an email, a video, a document, a data container, and/or an image, or multiple instances of any one or more of these, among others.

The method can extract text from the data item at 604. In some cases, optical character recognition can be performed on the data item to extract the text. In other cases, voice recognition processing can be performed on the data item to extract the text. In some cases, various types of text may be processed to obtain plain text. For instance, the data item may be manifest as hypertext markup language (HTML) text. The HTML text can be processed to obtain plain text.

The method can analyze the text to identify at a first confidence level whether the text includes a potential event at 606. The analyzing can include identifying at least some details of the potential event, such as what the potential event relates to, where the potential event occurs, and/or whom the potential event relates to. The presence of these details can contribute to determining the confidence level that an event has been identified. Of course, an event can be identified without all of the details, for instance, an event may include 'when' details and 'who' details, but no 'where' details, or some combination thereof.

The method can determine at a second confidence level whether the potential event relates to a known event at 608. For instance, the determining can include comparing the details identified at block 606 to search results produced by a search engine based upon the details. The weight given to the second confidence level can be adjusted based upon the event details of block 606. For instance, an event that appears to be a private event will likely have a lower correspondence to the search results than a more public event. Thus, if the details are "dinner with Jane on Friday at 6" the correlation to the search results tends not to be very determinative. However, if the details are "Apple Cup football game at Husky stadium on Nov. 19$^{th}$" and the search results show that to be a real event, the determinative value of satisfying the second confidence level can be very high.

The method can identify at a third confidence level whether the potential event matches an event profile of the user at 610. For example, the event profile can include previous events that the user has participated in and interests of the user. Continuing with the above example, if the user's profile indicates that the user is a big college football fan, a Husky fan, and has attended college football games at Husky stadium in the past, the third confidence level can be very high and very determinative.

The method can take an action on behalf of the user based upon the first, second, and third confidence levels at 612. For example, in an instance where the first, second, and third confidence levels are above a predefined value, the action can be automatically scheduling the potential event on a calendar(s) associated with the user.

Alternatively, in an instance where one or more of the first, second, and third confidence levels are above a predefined value, but below a second higher predefined value, then the action can be tentatively scheduling the potential event on a calendar(s) associated with the user and requesting a confirmation from the user. In still another instance where one or more of the first, second, and third confidence levels are below a predefined value, the action can be requesting more information from the user prior to auto-calendaring the potential event.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/media as a set of instructions such that execution by a computing device causes the computing device to perform the method.

CONCLUSION

Although techniques, methods, devices, systems, etc. pertaining to auto-calendaring are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a processor; and
storage having instructions stored thereon which, when executed by the processor, cause the processor to:
obtain text from a data item, the text relating to an upcoming event and including one or more established details for the upcoming event that have been determined by one or more users and are included in the text;
process the text to identify the upcoming event and the one or more established details for the upcoming event;
identify at least one undecided detail for the upcoming event that is not identified in the text obtained from the data item;
add the upcoming event to a calendar associated with a recipient of the data item, the upcoming event being added to the calendar with the one or more established details;
cause the upcoming event to be displayed on the calendar associated with the recipient with the one or more established details and an indication that the at least one undecided detail remains undecided;
receive user input requesting suggestions for the at least one undecided detail;

based at least a profile of the recipient reflecting tendencies of the recipient to attend certain types of events on weekends and other types of events on weekdays after work, identify one or more suggestions for the at least one undecided detail; and output the suggestions for the at least one undecided detail to the recipient.

2. The system of claim 1, wherein the at least one undecided detail is a restaurant where the recipient and a sender of the data item intend to have dinner, and the instructions, when executed by the processor, cause the processor to:

based at least on a location parameter identifying a location of the recipient of the data item, identify at least two suggested restaurants for the sender and the recipient to have dinner at a time specified by an individual established detail, the suggestions identifying the at least two suggested restaurants.

3. The system of claim 1, wherein the at least one undecided detail is a restaurant where the recipient and a sender of the data item intend to have dinner, and the instructions, when executed by the processor, cause the processor to:

based at least on a location parameter identifying a location of the sender of the data item, identify at least two suggested restaurants for the sender and the recipient to have dinner at a time specified by an individual established detail, the suggestions identifying the at least two suggested restaurants.

4. The system of claim 1, wherein the at least one undecided detail is a restaurant where the recipient and a sender of the data item intend to have dinner, and the instructions, when executed by the processor, cause the processor to:

based at least on a history parameter identifying past dinner events attended by the sender and the recipient of the data item, identify at least two suggested restaurants for the sender and the recipient to have dinner at a time specified by an individual established detail, the suggestions identifying the at least two suggested restaurants.

5. The system of claim 1, wherein the at least one undecided detail is a restaurant where the recipient and a sender of the data item intend to have dinner, and the instructions, when executed by the processor, cause the processor to:

obtain a first parameter identifying preferences of the recipient of the data item;

obtain a second parameter identifying preferences of the sender of the data item;

obtain a third parameter reflecting ratings of restaurants provided over the Internet; and based at least on the first parameter, the second parameter, and the third parameter, identify at least two suggested restaurants for the sender and the recipient to have dinner at a time specified by an individual established detail, the suggestions identifying the at least two suggested restaurants.

6. The system of claim 1, wherein the data item is a first email and the instructions, when executed by the processor, cause the processor to:

provide an auto-calendaring service and associated email address;

receive, at the associated email address of the auto-calendaring service, a second email that is a reply to the first email by the recipient; and add the upcoming event to the calendar responsive to receiving the second email at the auto-calendaring service.

7. The system of claim 6, wherein the instructions, when executed by the processor, cause the processor to:

by the auto-calendaring service, respond to the second email with a third email to the recipient indicating that the upcoming event has been added to the calendar.

8. A device, comprising:

a processor; and storage having instructions stored thereon which, when executed by the processor, cause the processor to:

receive a message sent from a sender to a recipient the message including text identifying one or more specified details for an upcoming event that are specified by the sender of the message;

identify at least one unspecified detail that is not specified by the text of the message;

add the upcoming event to a particular calendar of the recipient with the one or more specified details of the upcoming event that are identified by the text of the message;

cause a graphical user interface identifying the upcoming event to be displayed to the recipient, the graphical user interface identifying the one or more specified details of the upcoming event and the at least one unspecified detail for the upcoming event;

based at least upon a profile of the recipient reflecting tendencies of the recipient to attend certain types of events on weekends and other types of events on weekdays after work, obtain suggestions for the at least one unspecified detail; and cause the suggestions for the at least one unspecified detail to be displayed on the graphical user interface.

9. The device of claim 8, wherein the instructions, when executed by the processor, cause the processor to:

receive user input selecting a specific suggestion for the at least one unspecified detail; and responsive to the user input, replace the at least one unspecified detail with the specific suggestion on the particular calendar of the recipient.

10. The device of claim 8, wherein the instructions, when executed by the processor, cause the processor to:

select the particular calendar for the upcoming event from multiple calendars associated with the recipient, wherein the particular calendar is a private calendar for private events and the multiple calendars also include a work calendar for work events.

11. The device of claim 10, wherein the message is a particular email and the instructions, when executed by the processor, cause the processor to:

receive user input specifying that emails received from an email address of the sender are used to populate events on the private calendar instead of the work calendar; and select the private calendar instead of the work calendar based at least upon the particular email being received from the email address of the sender of the message.

12. The device of claim 10, wherein the message is a particular email and the instructions, when executed by the processor, cause the processor to:

receive user input specifying that emails containing a specific word are used to populate events on the private calendar instead of the work calendar; and select the particular calendar based at least upon the specific word appearing in the particular email.

13. The device of claim 8, wherein the instructions, when executed by the processor, cause the processor to:
   identify one or more previous events on the particular calendar that the recipient has attended on weekends and other previous events that the recipient has attended after work on weekdays; and
   update the profile of the recipient to reflect the tendencies of the recipient based at least on the one or more previous events and the other previous events.

14. The device of claim 8, wherein the message specifies a particular type of activity and the at least one unspecified detail is a location where the particular type of activity occurs, and the instructions, when executed by the processor, cause the processor to:
   identify, as the suggestions, at least two different public venues where the particular type of activity occurs.

15. A method comprising:
   processing text to identify an upcoming event and one or more specified details for the upcoming event that are specified in the text;
   identifying at least one unspecified detail for the upcoming event that is not specified by the text;
   adding the upcoming event to a calendar associated with a recipient of the text, the upcoming event being added to the calendar with the one or more specified details;
   causing the upcoming event to be output on the calendar associated with the recipient with the one or more specified details and an indication that the at least one unspecified detail remains unspecified;
   based at least upon a profile of the recipient reflecting tendencies of the recipient to attend certain types of events on weekends and other types of events on weekdays after work identifying one or more suggestions for the at least one unspecified detail; and
   outputting the suggestions for the at least one unspecified detail to the recipient.

16. The method of claim 15, further comprising:
   determining an event identification confidence level that the text identifies the upcoming event; and
   determining whether to add the upcoming event to the calendar based at least on the event identification confidence level.

17. The method of claim 15, further comprising:
   determining a profile matching confidence level that the upcoming event matches the profile of the recipient; and
   determining whether to add the upcoming event to the calendar based at least on the profile matching confidence level.

18. The method of claim 15, further comprising:
   outputting an indication that the at least one unspecified detail has yet to be determined with an option to obtain the suggestions; and
   outputting the suggestions in response to a selection of the option.

19. The method of claim 15, the one or more specified details including a date and time of the upcoming event, the at least one unspecified detail being a location of the upcoming event.

20. The method of claim 19, further comprising:
   identifying at least two different suggested locations for the upcoming event based at least on:
      a location of a sender of the text,
      a location of the recipient of the text,
      web-based reviews of different potential locations for the upcoming event,
      preferences of the sender of the text,
      preferences of the recipient of the text,
      past events attended by the sender of the text, and
      past events attended by the recipient of the text,
   wherein the outputting the suggestions comprises outputting the at least two different suggested locations for the upcoming event.

\* \* \* \* \*